United States Patent [19]

Kinoshita et al.

[11] Patent Number: 5,773,766
[45] Date of Patent: Jun. 30, 1998

[54] AXLE LOAD SCALE

[75] Inventors: Hidetoshi Kinoshita, Yokohama;
Tadayori Makino, Tokyo, both of Japan

[73] Assignee: Matsushita Electric Industrial Co., Ltd., Japan

[21] Appl. No.: 803,102

[22] Filed: Feb. 20, 1997

[30] Foreign Application Priority Data

Mar. 6, 1996 [JP] Japan ..................................... 8-048494

[51] Int. Cl.$^6$ .......................... G01G 19/22; G01G 19/52; G01G 19/02

[52] U.S. Cl. ......................... 177/25.13; 177/132; 177/134

[58] Field of Search ...................................... 177/132, 133, 177/134, 135, 25.11, 25.13, 25.14

[56] References Cited

U.S. PATENT DOCUMENTS

| | | | |
|---|---|---|---|
| 3,276,525 | 10/1966 | Cass | 177/132 |
| 3,835,945 | 9/1974 | Yamanaka et al. | 177/134 |
| 4,192,394 | 3/1980 | Simpson | 177/45 |
| 5,002,141 | 3/1991 | Loshbough et al. | 177/134 |
| 5,561,274 | 10/1996 | Brandorff | 177/145 |
| 5,585,604 | 12/1996 | Holm | 177/133 |

*Primary Examiner*—Michael L. Gellner
*Assistant Examiner*—Randy W. Gibson
*Attorney, Agent, or Firm*—Parkhurst & Wendel, L.L.P.

[57] ABSTRACT

An axle load scale with a load signal generation portion having a platform receiving an axle load of a vehicle running for generating a load signal according to the received axle load. The platform being a given size in a running direction of the vehicle and the axle load shows a sinusoidal variation with running of the vehicle The load signal shows a waveform including a top slope reflecting a portion of a waveform of the sinusoidal variation and a net weight of the axle load; a sinusoidal variation prediction portion for predicting the sinusoidal variation from the load signal; and a net axle load prediction portion for predicting and outputting a net axle load value from the predicted sinusoidal variation. The sinusoidal variation prediction portion predicts the waveform of the sinusoidal variation of axle load through detecting a magnitude an inclination of a detected top slope of a pulse of the load signal or the least squaring method. N load signal generation portions having N platforms arranged in a path of the vehicles generates intermittently continuous waveform of the sinusoidal variation, so that a waveform detection portion for detecting the intermittently continuous waveform and the net axle load prediction portion predicts similarly.

6 Claims, 6 Drawing Sheets

AXLE LOAD SCALE

BACKGROUND OF THE INVENTION

1. Field of the Invention

This invention relates to an axle load scale.

2. Description of the Prior Art

A platform scale for measuring a weight of a motor vehicle having a platform supporting all wheels of the motor vehicle and measuring the weight of the motor vehicle statically with an alarm system for alarming to accurately position all wheels is disclosed in U.S. patent publication No. 4,192,394.

SUMMARY OF THE INVENTION

The aim of the present invention is to provide an improved axle load scale.

According to the present invention, a first axle load scale is disclosed which comprises: a load signal generation portion having a platform receiving an axle load of a vehicle running for generating a load signal in accordance with the received axle load, the platform having a predetermined size in a running direction of the vehicle and the axle load showing a sinusoidal variation with running of the vehicle, thereby the load signal showing a pulse waveform including a top slope reflecting a portion of a waveform of the sinusoidal variation and a net weight of the axle load; a sinusoidal variation prediction portion for predicting the sinusoidal variation from the load signal; and a net axle load prediction portion for predicting and outputting a net axle load value from the predicted waveform.

In the first axle load scale, the sinusoidal variation prediction portion may comprise waveform detection portion for detecting the pulse waveform from the load signal and the sinusoidal variation detection portion predicts the sinusoidal variation in accordance with the detected pulse waveform. In this case, the waveform detection portion may comprise a top slope detection portion for detecting the top slope, a detection portion for detecting a magnitude of the top slope, and magnitude variation detection portion for detecting a magnitude variation of the top slope, and the net axle load prediction portion predicts the axle load from the detected magnitude and the detected magnitude variation.

In the first axle load scale, the net axle load prediction portion may comprise a minimal and maximal value detection portion for detecting maximal and minimal values of the predicted sinusoidal variation and an averaging portion for averaging the detected maximal and minimal values to provide an average value as the predicted net axle load value.

In the first axle load scale, the sinusoidal variation prediction portion may comprise a sampling portion for sampling values of the load signal and an operation portion for effecting a least squaring operation with the sampled values of the load signal, thereby predicting the sinusoidal variation.

According to this invention, a second axle load scale is provided which comprises: N load signal generation portions having N platforms which are arranged with predetermined intervals along a path for a vehicle and receives an axle load of the vehicle running, the N load signal generation portions generating N load signals in accordance with the received axle load respectively, the axle load showing a sinusoidal variation with running of the vehicle, thereby the N load signals showing N pulse waveforms including N top slopes reflecting intermittently continuing N portions of a waveform of the sinusoidal variation and a net value of the axle load, the N being a natural number; N waveform detection portions for detecting the N top slopes as the N portions of the waveform of the sinusoidal variation from the load signals from the N load signal generation portions on basis of a sampling signal respectively; a sinusoidal variation prediction portion for predicting the waveform of the sinusoidal variation from the N top slopes basis of the sampling signal and the interval; and a net axle load prediction portion for predicting and outputting a net axle load value from the predicted waveform.

In the second axle load scale, the N waveform detection means may comprise N detection means for detecting data regarding magnitudes and magnitude variations of the N portions and the sinusoidal variation prediction means predicts the sinusoidal variation using the data.

In the second axle load scale, the sinusoidal variation prediction portion may comprise a sampling portion for sampling values of the load signal and an operation portion for effecting a least squaring operation with the sampled values of the load signal, thereby predicting the sinusoidal variation.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing embodiments, a general principle of the measurement of an axle load according to the present invention will be described.

Generally, a vehicle runs with up and down movements at 3 to 10 Hz. Therefore, its dynamic axle load varies up and down also. Then, if it is tried to measure the axle load of a running vehicle, a net axle load should be determined from the dynamic axle load through analyzing the variation of the axle load of the vehicle. During running across a platform for measuring the axle load, the axle load varies and shows a portion of sinusoidal variation of the axle load as a top slope of a pulse of an axle load signal. The axle load scale apparatus of this invention predicts the net axle load or net weight of a running vehicle in accordance with a variation condition of a load signal indicative of an axle load on the platform.

A first embodiment of this invention will be described.

Figure 1:
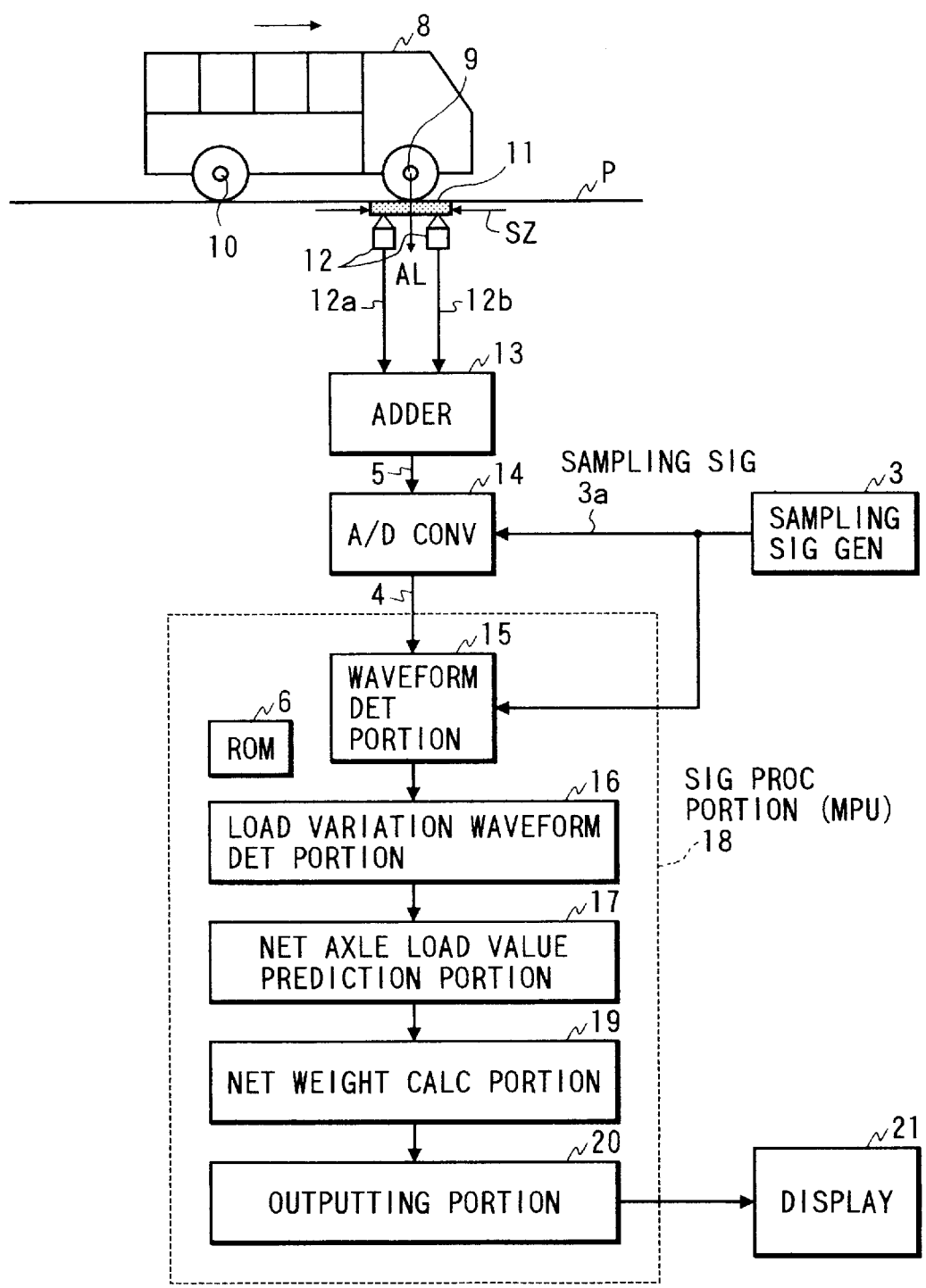
Fig. 1 is a block diagram of an axle load scale apparatus of a first embodiment.

Fig. 1 is a block diagram of an axle load scale apparatus of the first embodiment.

The axle load scale apparatus of the first embodiment comprises a platform 11 located in a surrounding road bed 9 for receiving an axle load of a vehicle 8, load cells 12 for supporting the platform 11 and generating load signals 12a and 12b in accordance with the received axle load, the platform 11 having a predetermined size SZ in a running direction of the vehicle 8 and the axle load showing a sinusoidal variation with the vehicle 8 running across the platform 11, thereby the load signal showing a pulse waveform including a top slope reflecting a portion of the sinusoidal variation and a net weight of the axle load, an adder 13 for adding the load signals 12a and 12b each other to generate a total load signal 5, and an a/d converter 14 for a/d-converting the total load signal 5 with a sampling signal 3a from a sampling signal generator 3, and a signal processing portion (microprocessor) 18 including: a waveform detecting portion 15 for detecting the pulse waveform from the output data of the a/d converter 14, a load variation prediction portion 16 for predicting the sinusoidal variation from the result from the waveform detection portion 15, a net axle load prediction portion 17 for predicting a net axle load value from the predicted sinusoidal variation, a net weight calculation portion 19 for calculating a net weight by adding the predicted rear axle load value to the predicted front axle load value, and an outputting portion 20 for displaying the net axle load value and the net weight on a display 20.

Figure 2:
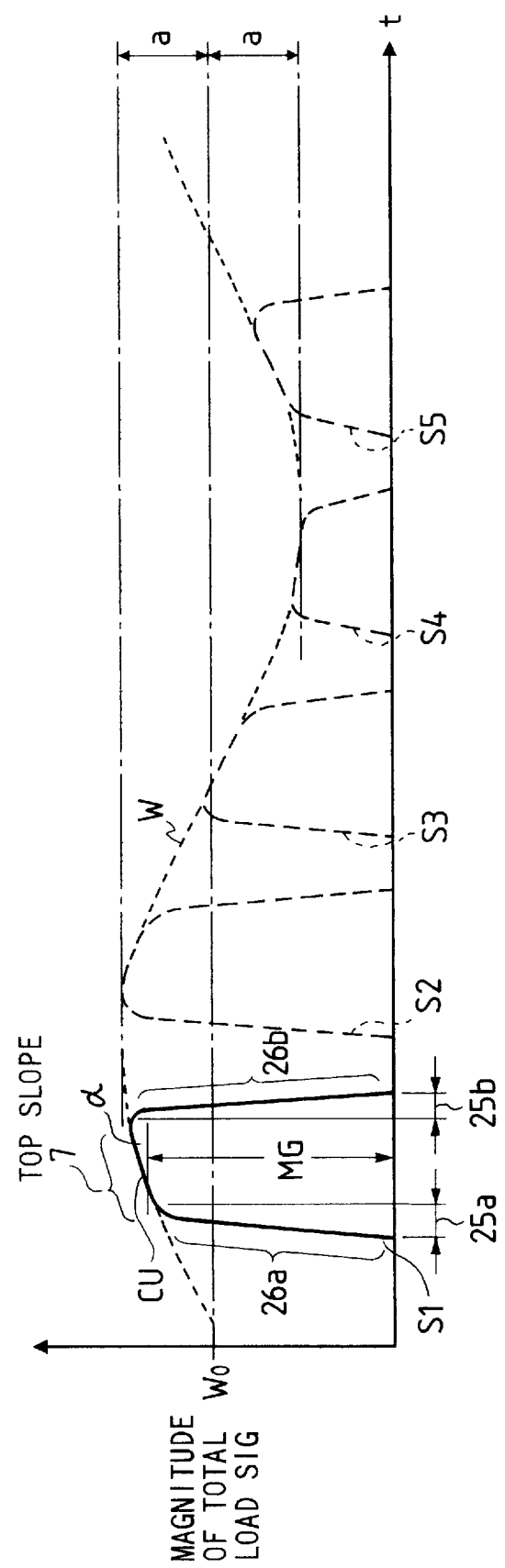
Fig. 2 is a graphic diagram of the first embodiment showing the pulse waveform and the sinusoidal variation of the load signal.

15 FIG. 2 is a graphic diagram of the first embodiment showing the pulse waveform s1 and the sinusoidal variation of the load signal. The pulse s1 is derived by the total axle load signal 5 for example. Either of pulses s2 to s5 may be derived from the total load signal 5 because the pulse may be derived at a different phase of the sinusoidal variation of the axle load with respect to the platform 11.

A vehicle 8 runs across the platform 11 at a speed. Front wheels of the vehicle 8 ride on the platform 11 which is located in the surrounding road bed 9. During running across the platform 11, the load cells 12 receives a front axle load of the vehicle 8 and generates load signals 12a and 12b in accordance with the received axle load. The platform 11 has the predetermined size SZ in a running direction of the vehicle 8 and a predetermined width. The axle load on the platform 11 shows a portion of the sinusoidal variation while the vehicle runs across the platform 11, thereby the load signal showing the pulse waveform s1 including the top slope 7 reflecting a portion of a waveform W of the sinusoidal variation and the net axle load Wo of the axle load. The speed of the vehicle may be limited in accordance with the size SZ in the running direction. In other words, the size SZ is determined in consideration of the speed of the vehicle to obtain a sufficient amount of the data from the pulse s1 to determined the sinusoidal variation.

The adder 13 adds the load signals 12a and 12b from the load cells 12 each other to generate the total axle load signal 5. The a/d converter 14 a/d-converts the total axle load signal 5 with the sampling signal 3a. The signal processing portion 18 has the ROM 6 storing programs of: the waveform detecting portion 15 for detecting the pulse waveform of the output data from the a/d converter 14; a load variation detection portion 16 for predicting the sinusoidal variation from the detected pulse waveform; a net axle load prediction portion 17 for predicting a net axle load value from the predicted sinusoidal variation; a net weight calculation portion 19 for calculating a net weight by adding the predicted rear axle load value to the predicted front axle load value; and the outputting portion 20 for displaying the net axle load value on a display 20.

A net axle load of the rear axle 10 is similarly predicted and displayed on the display 20. Further, a net weight calculation 19 calculates the net weight of the vehicle 8 by adding the net axle loads of the front and rear axle 10 and displays the net weight on the display 21 also by the outputting portion 20.

The operation of predicting the net axle load will be described more specifically.

The waveform detection portion 15 detects the top slope 7 of the detected pulse s1 using plurality of sets of sampled data of the total axle load signal 5 from the a/d converter 14. For example, twenty sets of sampled data are used.

The load variation waveform, that is, the sinusoidal variation, can be predicted by detecting inclinations a of the top slope 7. The inclinations a indicate which portion of the waveform W of the sinusoidal variation corresponds to the top slope 7. Then, the net axle load value prediction portion 17 can predict the net axle load in accordance with the detected magnitude MG and the inclinations α. The inclinations a are detected twice or more within the period of the pulse s1 to make this detection more accurate. Moreover, more than twice detections of the inclinations α provide a curvature of the top slope of the pulse s1. In these cases, the inclinations and the curvature can be considered as variations in the magnitude.

Figure 5:
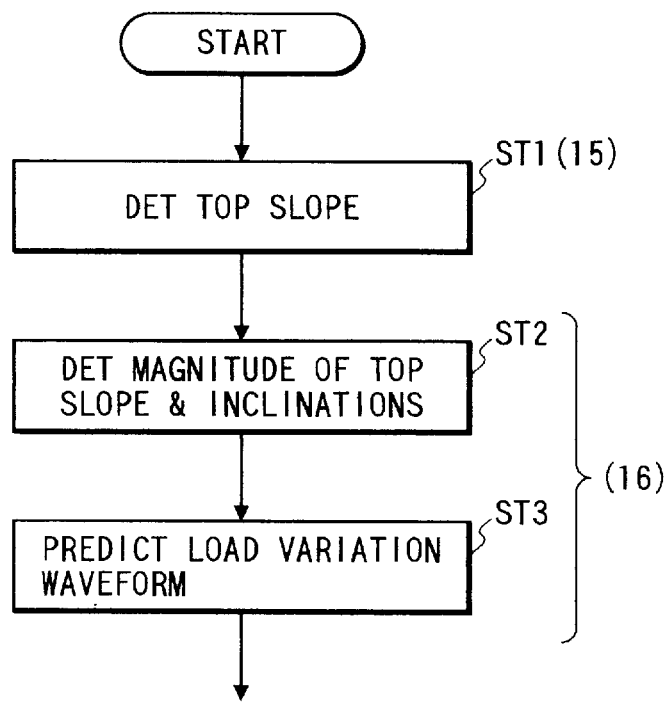
Fig. 5 depicts a flow chart of the first embodiment showing the load variation waveform detection operation.

FIG. 5 depicts a flow chart of the first embodiment showing the load variation waveform detection operation.

In step st1, the microprocessor 18 detects the top slope 7 from the data from the a/d converter 14 by the waveform detection program. More specifically, data at transient portions 26a and 26b of the pulse s1, which have high inclination values than that of the top slope 7, are removed through comparing inclinations therebetween or sampled values are not used for predetermined transition intervals 25a and 25b. In the following step st2, the microprocessor 18 detects the inclinations α and the magnitude MG of the top slope 7 and in step st3, the microprocessor 18 predicts the load variation waveform W by the load variation waveform detection program 16.

Figure 6:
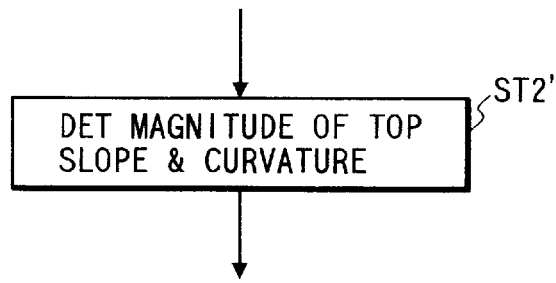
Fig. 6 depicts a flow chart of the first embodiment showing a modification of the load variation waveform detection operation.

FIG. 6 depicts a flow chart of the first embodiment showing a modification of the load variation waveform detection operation. In this modification, step st2' replaces the step st2. In step st2' following to st1, the microprocessor 18 detects a curvature CU and a magnitude MG of the top slope. Then, in the following step st3, the microprocessor 18 predicts the load variation waveform from the magnitude MG and the curvature CU. In other words, the waveform detection portion 15 includes a top slope detection step st1 for detecting the top slope, a detection processing for detecting a magnitude MG of the top slope, and a magnitude variation detection processing in step st2 or st2' for detecting a magnitude variation of the top slope 7, and the net axle load prediction portion 17 predicts the axle load from the detected magnitude and the detected magnitude variation.

Then, the net axle load value prediction operation will be described.

When the load variation waveform is predicted, a net axle load value can be predicted by averaging the maximal value and the minimal value of the predicted load variation waveform W, i.e., the sinusoidal variation, by the net axle load value prediction portion 17.

Figure 7:
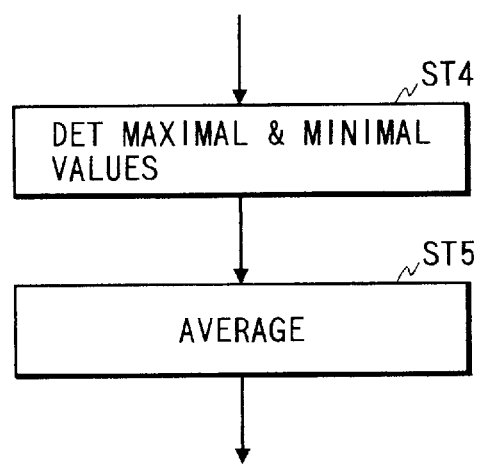
Fig. 7 depicts a flow chart of the first embodiment showing the net axle load value prediction operation.

FIG. 7 depicts a flow chart of the first embodiment showing the net axle load value prediction operation.

In step st4, the microprocessor 18 detects a maximal value and a minimal value of the waveform W of the sinusoidal variation. In the following step st5, the microprocessor 18 averages the maximal value and minimal value to provide the net axle load value.

There are another modifications for predicting the sinusoidal variation and the net load value which may be effected by the load variation detection portion 16.

Figure 8:
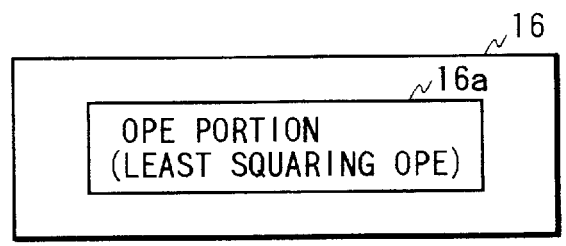
Fig. 8 shows a partial block diagram of a modification of the first embodiment.

For example, the least squaring operation is used. FIG. 8 shows a partial block diagram of a modification of the first embodiment.

The load variation waveform detection portion 16 includes an operation portion 16a provided by an operation program in the ROM 6 for effecting the well-known least squaring operation to detect the sinusoidal waveform.

Assuming that the sinusoidal variation of the axle load is represented by:

$$y(t) = W_o + a \cdot \sine(\omega t + \phi) \tag{1}$$

Where Wo is the net axle load value. Moreover, it is assumed that the sampled data is represented by di (i=1, 2, 3, . . . , n-1, n) wherein di is sampled at ti. The sinusoidal variation y(t) is obtained by the sampled data di through the least squaring operation by solving the following equations:

$$f_1 = \frac{\partial S}{\partial W_o} = 0 \tag{2}$$

$$f_2 = \frac{\partial S}{\partial a} = 0$$

$$f_3 = \frac{\partial S}{\partial \omega} = 0$$

$$f_4 = \frac{\partial S}{\partial \phi} = 0$$

wherein $$S = \sum_{i=1}^{n} (y(ti) - d) \tag{3}$$

These simultaneous equations are solved by Newton's method, so that the following iteration equation is given:

$$\begin{pmatrix} \Delta w_0 \\ \Delta a \\ \Delta \omega \\ \Delta \phi \end{pmatrix} = \begin{pmatrix} \frac{\partial^2 S}{\partial W_o^2} & \frac{\partial^2 S}{\partial a \partial W_o} & \frac{\partial^2 S}{\partial \omega \partial W_o} & \frac{\partial^2 S}{\partial \phi \partial W_o} \\ \frac{\partial^2 S}{\partial W_o \partial a} & \frac{\partial^2 S}{\partial a^2} & \frac{\partial^2 S}{\partial \omega \partial a} & \frac{\partial^2 S}{\partial \phi \partial a} \\ \frac{\partial^2 S}{\partial W_o \partial \omega} & \frac{\partial^2 S}{\partial a \partial \omega} & \frac{\partial^2 S}{\partial \omega^2} & \frac{\partial^2 S}{\partial \phi \partial \omega} \\ \frac{\partial^2 S}{\partial W_o \partial \phi} & \frac{\partial^2 S}{\partial a \partial \phi} & \frac{\partial^2 S}{\partial \omega \partial \phi} & \frac{\partial^2 S}{\partial \phi^2} \end{pmatrix}^{-1} \begin{pmatrix} -f_1(W_o, a, \omega, \phi) \\ -f_2(W_o, a, \omega, \phi) \\ -f_3(W_o, a, \omega, \phi) \\ -f_4(W_o, a, \omega, \phi) \end{pmatrix} \tag{I}$$

In the first embodiment, if twenty sets of data are sampled from the pulse s1 with the sampling signal 3a, n=20

In this condition, in the equations (1) to (4), suitable initial values of Wo, a, $\omega$, $\phi$ are substituted and the operation is repeated using the values obtained from these equations. Then, until the values become convergent, this operation is repeated to obtain resolution of the equations, so that the net axle load value Wo can be obtained.

However, in the case that the least squaring operation is used, the solution may not be obtained because the operation is repeated in an adequate condition, that is, a divergent condition. This condition can be avoided considerably, by limiting the initial values and other values for the least squaring operation to a practical range. For example, the sinusoidal variation is limited to 3 to 10 Hz, so that the value of o can be limited from 6 $\pi$ to 20 $\pi$. The amplitude a is less than one third of the maximum value of the sinusoidal variation waveform W. Moreover, a maximum repetition times of the least squaring operation is limited and if the repetition times exceeds the limitation, the net axle load value prediction portion 17 outputs the average value of the maximal and minimal values or the maximum value as the axle load.

Figure 3:
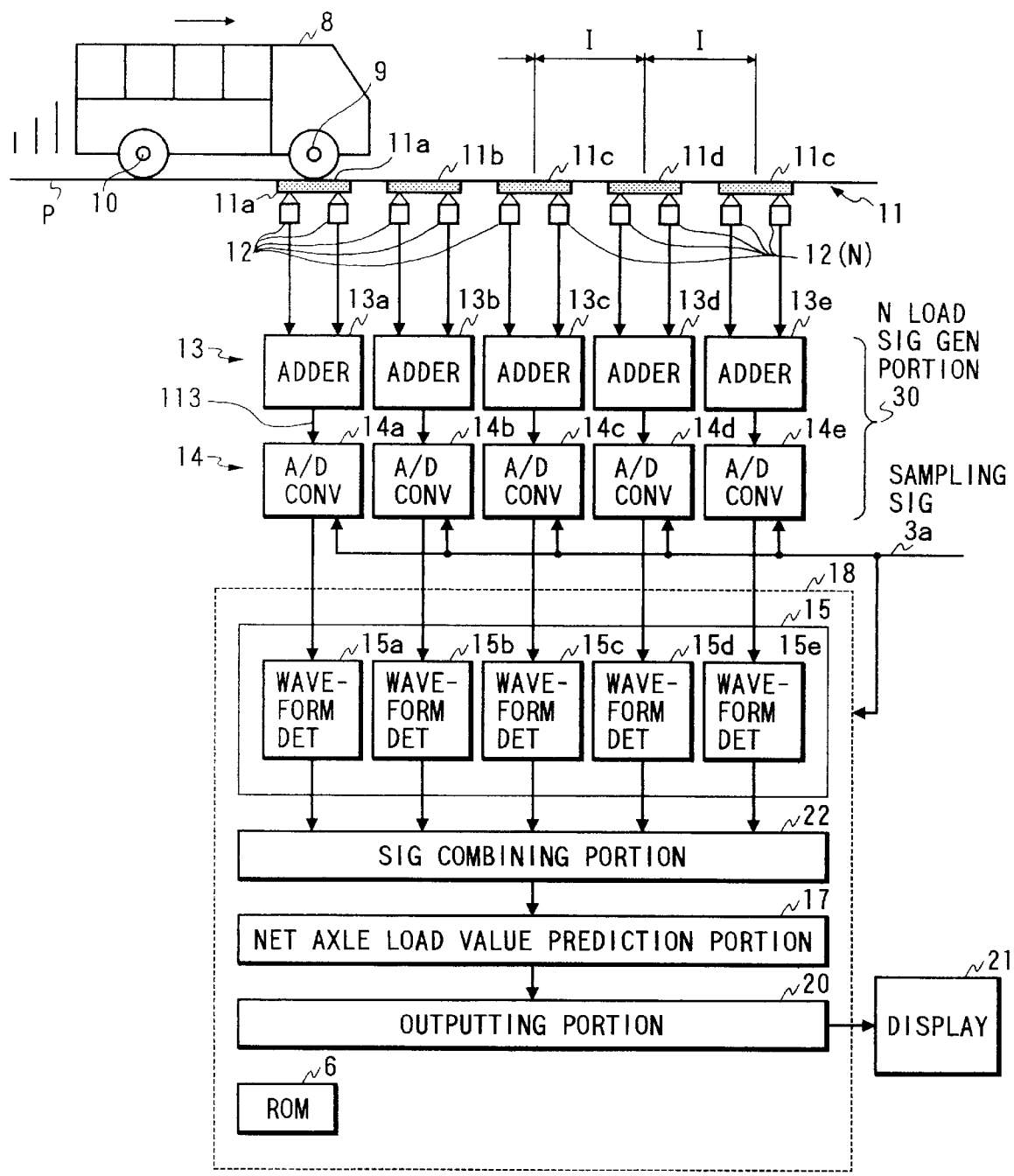
Fig. 3 is a block diagram of an axle load scale of a second embodiment.

A second embodiment will be described. FIG. 3 is a block diagram of an axle load scale of a second embodiment.

The axle load scale of the second embodiment comprises N (four) load signal generation portions 30 having N platforms 11 which are arranged at predetermined intervals I along a path P for a vehicle 8 and receives an axle load of the vehicle 8 running, the N load signal generation portions 30 generating N load signals in accordance with the received axle load respectively, the axle load showing a sinusoidal variation with running of the vehicle 8, thereby the N load signals showing N top slopes reflecting intermittently continuing portions of a waveform W of the sinusoidal variation and a net weight WO of the axle load, a waveform detection portion 15 for detecting N intermittently continuing portions of the waveform of the sinusoidal variation from the load signals from the N load signal generation portions 30 respectively, Each load signal generation portion 30 includes a platform 11 for receiving the axle load of the vehicle 8, a pair of load cells 12 for supporting the platform 11 and generating load signals 12a and 12b in accordance with the received axle load, the platform 11 having a predetermined size in a running direction of the vehicle, an adder 13 for adding the load signals 12a and 12b each other to generate a total load signal 113, and an a/d converter 14 for a/d-converting an output of the adder 13 with a sampling signal 3a. The signal processing portion (microprocessor) 18 includes the waveform detecting portion 15 for detecting waveforms of pluses in output signals from the a/d converters 14, a signal combining portion 22 for combining results of the detected waveforms indirectly representing the sinusoidal variation, a net axle load value prediction portion 17 for predicting the net axle load from the combined result from the signal combining portion 22, and an outputting portion 20 for outputting the predicted net axle load. A display 21 displays the predicted net axle load from the outputting portion 20. The microprocessor 18 includes a ROM 6 which stores a waveform detecting program for providing an operation of the waveform detecting portion 15, a signal combining program for providing an operation of the signal combining portion 22, a net axle load value prediction program for providing an operation of the net axle load value prediction portion 17, and an outputting program for providing an operation of the outputting portion 20 for outputting the predicted net axle load. Each load signal generation portion comprises the adder 13, the a/d converter 14 as similar to the first embodiment.

An operation will be described.

The N load signal generation portions 30 generates N load signals in accordance with the received axle load respectively.

Figure 4:
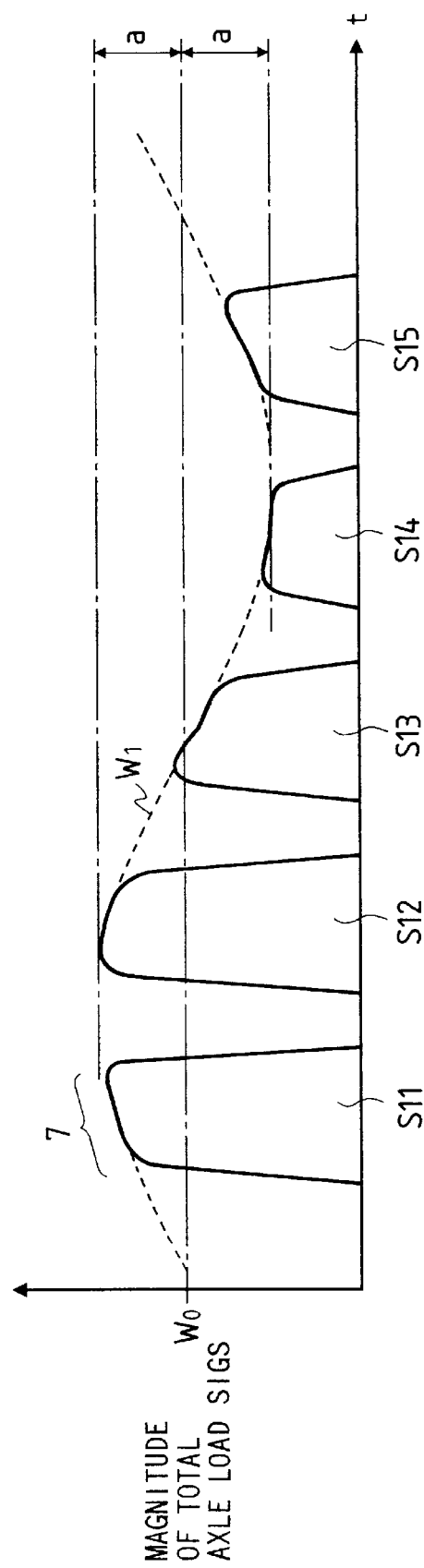
Fig. 4 is a graphic diagram of the second embodiment showing the sinusoidal variation of the load signal.

FIG. 4 is a graphic diagram of the second embodiment showing the sinusoidal variation of the load signal, wherein pulses s11 to s15 of the total load signals 113 are shown at respective durations determined by the locations of the platforms 11. When the vehicle 8 runs across the platforms 11a to 11e in this order, the load cells 12 supporting the platforms 11a to 11e generate pulses s11 to s15 intermittently.

The axle load shows the sinusoidal variation with running of the vehicle 8, thereby the N total load signals showing N top slopes 7a reflecting intermittently continuing portions of the waveform W1 of the sinusoidal variation and a net weight W0 of the axle load. N is a natural number.

N waveform detection portions 15 detects the top slopes 7 corresponding to the intermittently continuing portions of the waveform W1 of the sinusoidal variation from the total load signals from the N load signal generation portions 30 respectively.

The signal combining portion 22 combines outputs signals from the wave form detection portion 15 to predict the waveform W of the sinusoidal variation from the N top slopes basis of the sampling signal and the interval. The net axle load prediction portion 17 predicts and outputs the net axle·load value from the detected sinusoidal variation.

The net value is obtained from the predicted waveform W1 of the sinusoidal variation of the axle load as similar to the first embodiment. That is, the net value of the axle load is obtained by averaging the maximal value and minimal value of the predicted waveform W1 of the sinusoidal variation. Moreover, the waveform of the sinusoidal variation and the net value of the axle load can be obtained by the least squaring operation as similar to the first embodiment. In this case, the number of sampling timings is one hundred in the case of the FIG. 4, so that the waveform W1 of the sinusoidal variation can be predicted more accurately.

In the second embodiment, the N waveform detection portions 15 may includes the N detection portions for detecting data regarding magnitudes and magnitude variation of the N potions as similar to the first embodiment and the signal combining portion 22 predicts the sinusoidal variation using the data.

What is claimed is:

1. An axle load scale comprising:

load signal generation means having a platform receiving an axle load of a vehicle running for generating a load signal in accordance with the received axle load, the platform having a predetermined size in a running direction of the vehicle and the axle load showing a sinusoidal variation with running of the vehicle, thereby the load signal showing a pulse waveform including a top slope reflecting a portion of a waveform of the sinusoidal variation and a net weight of the axle load;

sinusoidal variation prediction means for predicting the sinusoidal variation from the load signal; and net axle load prediction means comprising minimal and maximal value detection means for detecting maximal and minimal values of the predicted sinusoidal variation and averaging means for averaging the detected maximal and minimal values to provide an average value as the predicted net axle load value.

2. An axle load scale comprising:

load signal generation means having a platform receiving an axle load of a vehicle running for generating a load signal in accordance with the received axle load, the platform having a predetermined size in a running direction of the vehicle and the axle load showing a sinusoidal variation with running of the vehicle, thereby the load signal showing a pulse waveform including a top slope reflecting a portion of a waveform of the sinusoidal variation and a net weight of the axle load;

sinusoidal variation prediction means comprising sampling means for sampling values of the load signal and operation means for effecting a least squaring operation with the sampled values of the load signal, thereby predicting the sinusoidal variation; and net axle load prediction means for predicting and outputting a net axle load value from the predicted sinusoidal variation.

3. An axle load scale comprising:

load signal generation means having a platform receiving an axle load of a vehicle running for generating a load signal in accordance with the received axle load, the platform having a predetermined size in a running direction of the vehicle and the axle load showing a sinusoidal variation with running of the vehicle, thereby the load signal showing a pulse waveform including a top slope reflecting a portion of a waveform of the sinusoidal variation and a net weight of the axle load;

sinusoidal variation prediction means using waveform detection means for detecting the pulse waveform from the load signal and the sinusoidal variation detection means predicts the sinusoidal variation in accordance with the detected pulse waveform;

net axle load prediction means for predicting and outputting a net axle load value from the predicted sinusoidal variation; wherein said waveform detection means comprises top slope detection means for detecting the top slope, detection means for detecting a magnitude of the top slope, and magnitude variation detection means for detecting a magnitude variation of the tope slope, and the net axle load prediction means predicts the axle load from the detected magnitude and the detected magnitude variation.

4. An axle load scale comprising:

N load signal generation means having N platforms which are arranged with predetermined intervals along a path for a vehicle and receives an axle load of the vehicle running, the N load signal generation means generating N load signals in accordance with the received axle load respectively, the axle load showing a sinusoidal variation with running of the vehicle, thereby the N load signals showing N pulse waveform including N top slopes reflecting intermittently continuing N portions of a waveform of the sinusoidal variation and a net value of the axle load, the N being a natural number;

N waveform detection means for detecting the N top slopes as the N portions of the waveform of the sinusoidal variation from the load signals from the N load signal generation means on basis of a sampling signal respectively;

sinusoidal variation prediction means for predicting the waveform of the sinusoidal variation from the N top slopes basis of the sampling signal and the interval; and net axle load prediction means for predicting and outputting the net value of the axle load value from the predicted waveform.

5. An axle load scale as claimed in claim 4, wherein the N waveform detection means comprises the N detection means for detecting data regarding magnitudes and magnitude variation of the N potions and the sinusoidal variation prediction means predicts the sinusoidal variation using the data.

6. An axle load scale as claimed in claim 4, wherein the sinusoidal variation prediction means comprises sampling means for sampling values of the load signal and operation means for effecting a least squaring operation with the sampled values of the load signal, thereby predicting the sinusoidal variation.

* * * * *